US012020649B2

(12) United States Patent
Choi et al.

(10) Patent No.: US 12,020,649 B2
(45) Date of Patent: Jun. 25, 2024

(54) DISPLAY CLOCK SIGNALING WITH REDUCED POWER CONSUMPTION

(71) Applicant: GOOGLE LLC, Mountain View, CA (US)

(72) Inventors: Sangmoo Choi, Palo Alto, CA (US); Janghoon Song, Seoul (KR)

(73) Assignee: Google LLC, Mountain View, CA (US)

( * ) Notice: Subject to any disclaimer, the term of this patent is extended or adjusted under 35 U.S.C. 154(b) by 2 days.

(21) Appl. No.: 17/758,677

(22) PCT Filed: Aug. 24, 2020

(86) PCT No.: PCT/US2020/070452
§ 371 (c)(1),
(2) Date: Jul. 12, 2022

(87) PCT Pub. No.: WO2022/046148
PCT Pub. Date: Mar. 3, 2022

(65) Prior Publication Data
US 2023/0029925 A1 Feb. 2, 2023

(51) Int. Cl.
*G09G 3/3266* (2016.01)
*G09G 3/3225* (2016.01)

(52) U.S. Cl.
CPC ......... *G09G 3/3266* (2013.01); *G09G 3/3225* (2013.01); *G09G 2310/0262* (2013.01);
(Continued)

(58) Field of Classification Search
CPC .. G09G 3/3266; G09G 3/3225; G09G 3/2092; G09G 3/3677; G09G 2310/0262;
(Continued)

(56) References Cited

U.S. PATENT DOCUMENTS 9,711,075 B2 7/2017 Lee et al.
10,283,037 B1 5/2019 Far et al.
(Continued)

FOREIGN PATENT DOCUMENTS

EP 3113012 A2 1/2017
EP 3246911 A1 11/2017
WO 2019192430 A1 10/2019

OTHER PUBLICATIONS

International Search Report and Written Opinion for PCT Application No. PCT/US2020/070452, dated Jun. 11, 2021, 25 pages.
(Continued)

*Primary Examiner* — David Tung
(74) *Attorney, Agent, or Firm* — Fish & Richardson P.C.

(57) ABSTRACT

A display can include a plurality of pixels arranged in a matrix of rows and columns, and a gate driver circuit including a plurality of row drivers configured as a shift register that sequentially and individually addresses the rows. The display panel can also include a first clock circuit configured to provide a first set of clock signals to a first portion of the row drivers to address a respective first portion of the rows. The first clock circuit can include a signal distribution circuit having a first input impedance. The display panel can also include a second clock circuit configured to provide a second set of clock signals to a second portion of the row drivers to address a respective second portion of the rows. The second clock circuit can include a signal distribution circuit having a second input impedance that is matched with the first input impedance.

5 Claims, 9 Drawing Sheets

(52) U.S. Cl.
CPC . *G09G 2310/0286* (2013.01); *G09G 2310/08* (2013.01); *G09G 2320/0247* (2013.01); *G09G 2320/0266* (2013.01); *G09G 2330/021* (2013.01)

(58) Field of Classification Search
CPC ....... G09G 2310/0286; G09G 2310/08; G09G 2310/0224; G09G 2310/067; G09G 2320/0247; G09G 2320/0266; G09G 2320/0223; G09G 2330/021; G09G 2340/0435
See application file for complete search history.

(56) References Cited

U.S. PATENT DOCUMENTS

| | | | | |
|---|---|---|---|---|
| 2014/0168182 | A1 | 6/2014 | Yamamoto et al. | |
| 2015/0279480 | A1 | 10/2015 | Murakami et al. | |
| 2016/0300546 | A1 | 10/2016 | Zheng et al. | |
| 2016/0335972 | A1* | 11/2016 | Lee | G09G 3/3611 |
| 2017/0337876 | A1* | 11/2017 | Kim | G09G 3/3233 |
| 2019/0180691 | A1 | 6/2019 | Takasugi | |
| 2019/0333433 | A1* | 10/2019 | Zhu | G09G 3/20 |

OTHER PUBLICATIONS

International Preliminary Report on Patentability in International Appln. No. PCT/US2020/070452, dated Mar. 9, 2023, 18 pages.
Invitation to Pay Additional Fees in International Appln. No. PCT/US2020/070452, dated Apr. 26, 2021, 15 pages.

* cited by examiner

DISPLAY CLOCK SIGNALING WITH REDUCED POWER CONSUMPTION

CROSS REFERENCE TO RELATED APPLICATION

This application is a 35 U.S.C. § 371 National Phase Entry Application from PCT/US2020/070452 filed Aug. 24, 2020, designating the U.S., the disclosures of which are incorporated herein by reference in their entireties.

TECHNICAL FIELD

This document relates, generally, to display devices used in electronic devices. More specifically, this document relates to approaches for providing clock signals for gate drivers of a display panel (e.g., an active-matrix, organic light-emitting diode display panel) with reduced power consumption and high image quality.

BACKGROUND

Technology used in electronic devices, such as mobile electronic devices (e.g., smartphones, tablet computers, etc.) continues to advance. With such technology advancements, one important consideration during development of an electronic device can be to reduce power consumption of the device. For instance, one significant contributing factor for power consumption of mobile electronic devices (as well as other electronic devices) is dynamic power dissipation in active-matrix display panels, such as dynamic power used to drive (e.g., clock) row line drivers, which can be integrated in the display panel. Such drivers can be referred to, e.g., as row drivers, row line drivers, pixel row drivers, SCAN drivers, SCAN line drivers, gate drivers, gate line drivers, gate write (GW) drivers, GW signal drivers, and so forth. More specifically, power that is consumed when driving (providing clock signals to) input clock lines (e.g., connected to a shift register circuit in which the row drivers are included) can be a significant portion (e.g., 20%) of the total power used by circuitry used to drive (operate, power, etc.) a corresponding display panel (e.g., an active-matrix display panel). The amount of power used to drive such clock lines is due, at least in part, to parasitic capacitance of the clock signal lines, which can be significant in high resolution displays, such as active-matrix, organic light-emitting diode (AMOLED) displays. Furthermore, as high frame frequencies (e.g., refresh rates), such as 90 hertz (Hz) and 120 Hz, become more prevalent in mobile electronic devices, where battery life is an important performance parameter, reducing overall power consumption used to operate is desirable.

In conventional panel-integrated gate driver circuits included in active-matrix display panels, a single set of input clock signals for the shift registers is supplied to all stages of a shift register (included in a gate driver circuit) that includes the row drivers for each pixel row of the display panel, even though the clock signals address each row driver only once per scan cycle (e.g., once per frame, once per refresh cycle, etc.). Providing the clock signals to row drivers for pixels rows that are not being addressed is a source of wasted power consumption due to the impedance (e.g., capacitance and resistance) of the signal lines used to provide the clock signal and/or the input impedances of the row drivers. Further, for high frame frequency displays (e.g., with 90 Hz or 120 Hz refresh rates), the size of the transistors used in the associated row drivers is larger than the size of transistors used in lower frame frequency displays in order to be capable of high speed operation. These larger transistors increase the overall (aggregate, lumped, etc.) impedance of the clock distribution signaling lines (e.g., clock distribution circuit, clock distribution tree, etc.).

In some implementations, clock signals provided to row drivers of a display panel (e.g., integrated row drivers) can be separated into groups (stages, etc.), where a first clock signal (or first set of clock signals) is provided to a first portion of the row drivers and a second clock signal (or second set of clock signals) is provided to a second portion of the row drivers. In such approaches, additional clock signals (or sets of clock signal) can be provided to other respective portions (e.g., a third portion, a fourth portion, etc.) of the row drivers. In such implementations, when one clock signal (or set of clock signals) is active (e.g., driven, swung, etc.), the other clock signals (or sets of clock signals) can be held at a constant voltage or logic value (e.g., they can be idled, inactive, not swung, etc.). While such approaches can reduce overall power consumption (due, at least, to the clock signals idle periods), such approaches can also cause undesired artifacts in displayed images, such as brightness differences, flicker, lines, etc., which reduces the quality of displayed images (e.g., photos, video, animation, etc.). Accordingly, approaches that achieve power reduction and prevent the introduction of such image artifacts are needed.

SUMMARY

In a general aspect, an active-matrix display, which can be included in an electronic device can include a display area including a plurality of display pixels arranged in a matrix of a plurality of pixel rows and a plurality of pixel columns, and a gate driver circuit including a plurality of pixel row drivers. The plurality of pixel row drivers can be configured as a shift register that sequentially and individually addresses the plurality of pixel rows of the display area. The display can further include a first clock circuit configured to provide a first set of clock signals to a first portion of the plurality of pixel row drivers to address a respective first portion of the plurality of pixel rows. The first clock circuit can include at least one clock signal distribution circuit having a first input impedance. The display can still further include a second clock circuit configured to provide a second set of clock signals to a second portion of the plurality of pixel row drivers to address a respective second portion of the plurality of pixel rows. The second clock circuit can include at least one clock signal distribution circuit having a second input impedance that is matched with the first input impedance. In another general aspect an electronic device can include the active-matrix display.

In another general aspect, a method for operating an active-matrix display can include providing, via at least a first clock distribution circuit having a first input impedance, a first set of clock signals to a first portion of a plurality of pixel row drivers included in a gate driver circuit. The plurality of pixel row drivers can be configured as a shift register that sequentially and individually addresses a plurality of pixel rows of a display area of the active-matrix display. The first portion of the plurality of pixel row drivers can be coupled, respectively, with pixel rows of a first portion of the plurality of pixel rows. The method can also include providing, via at least a second clock distribution circuit having a second input impedance, a second set of clock signals to a second portion of the plurality of pixel row drivers included in the gate driver circuit. The second portion of the plurality of pixel row drivers can be coupled, respectively, with pixel rows of a second portion of the plurality of pixel rows. The second input impedance can be matched with the first input impedance.

It will be appreciated that features described in the context of one aspect can be implemented in the context of another aspect. For example, features indicated as being features of the active-matrix display can also be implemented in the method. The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Figure 1:
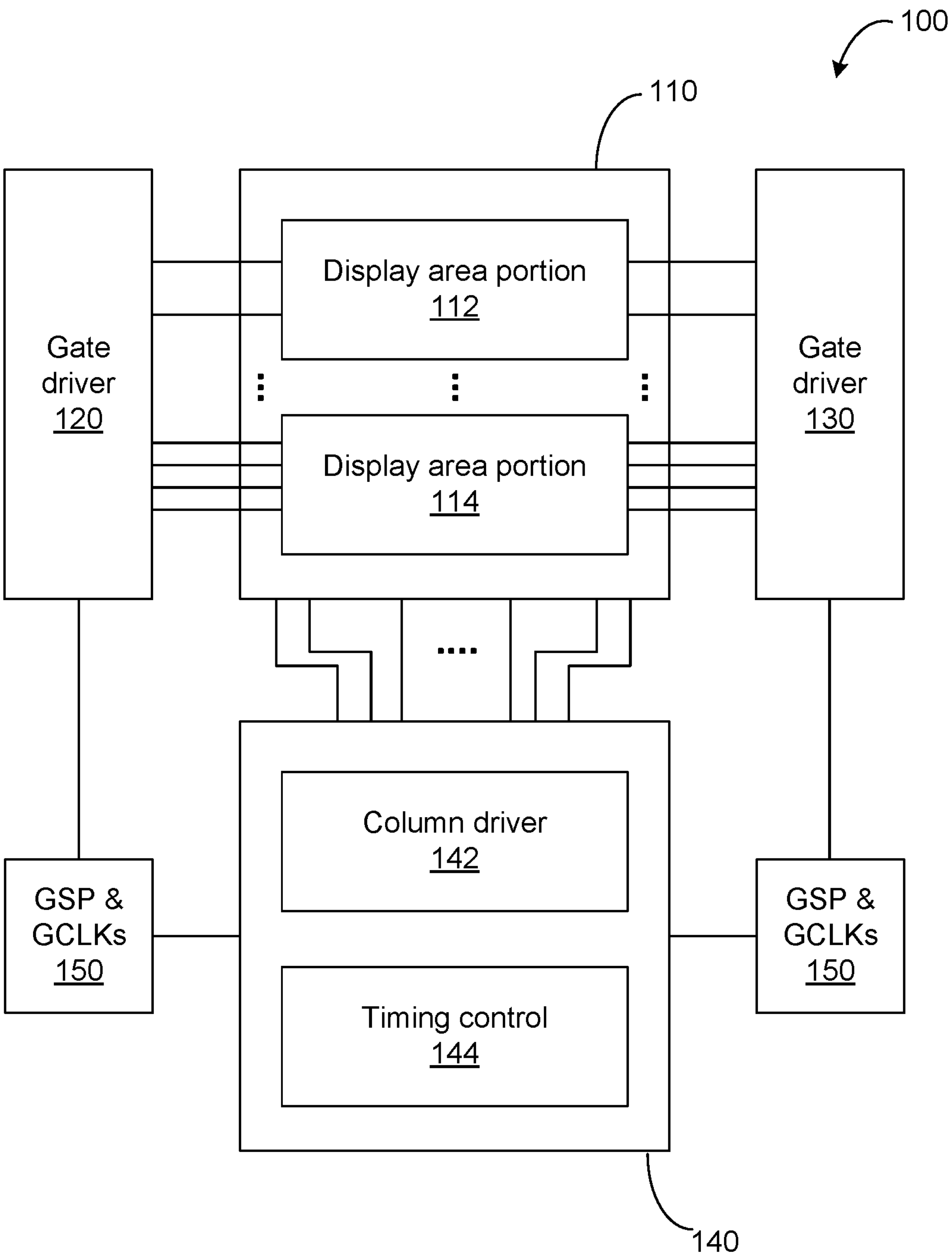
FIG. 1 is a block diagram illustrating a display apparatus.

The approaches disclosed and described herein can address the drawbacks discussed above, such as power consumption and/or introduction of image artifacts, which can result from using multiple clock signal distribution circuits (clock signal trees, clock signal networks, etc.) to address pixel rows of a display. For instance, the example implementations described herein use various approaches to achieve reductions in power consumption, while preventing introduction of image artifacts. As noted above, such artifacts can include brightness differences between groups of pixel rows (display portions) addressed by different clock signals, flicker resulting from using different clock signals to address pixel rows of different display portions (groups of pixel rows), lines between display portions, etc.

For instance, to address such drawbacks, the approaches described herein can include implementing impedance matched clock distribution circuits for distributing different clock signals (clock signal sets) to different pixel row groups (display portions), which can help prevent introduction of image artifacts. Further, the approaches described herein can use alternately active clock signals (or groups of clock signals) to reduce power consumption, and/or can implement blending (vertical and/or horizontal blending) of pixel row groups to further prevent the introduction of image artifacts. As noted above and described further herein, these approaches can reduce power consumption of the described displays, as compared to prior approaches, as well as prevent introduction of image artifacts that can result from the use of multiple clock signals to drive respective groups of gate drivers to address corresponding pixels rows.

For example, in some implementations, such as the approaches described herein, rather than using a single set of input clock signals for gate driver circuits of a display, the disclosed approaches include dividing those clock signals into multiple sets of clock signals that are provided to a gate driver circuit for sequentially addressing pixel rows of corresponding display area portions of a display panel. While the implementations described herein are generally described as having two sets of clock signals used to respectively address pixel rows of two corresponding groups of pixel rows (pixel row groups, display portions, display area portions, etc.), it will be appreciated that some implementations can utilize more than two sets of clock signals to respectively address pixel rows of more than two corresponding pixel row groups.

For instance, clock signals for driving (clocking, etc.) a gate driver circuit (e.g., shift register) for a display panel can, depending on the implementation, be divided into two to ten sets of clock signals, which can drive row drivers for corresponding display portions. In some implementations, more than ten sets of clock signals can be used.

As noted above, in the example implementations described herein, two sets of clock signals are discussed, where a first set of clock signals can include a GCLK1-1 clock signal and a GCLK2-1 clock signal. In the disclosed implementations, a second set of clock signals can include a GCLK1-2 clock signal and a GCLK2-2 clock signal. In the implementations described herein, such as those illustrated by the timing diagrams of at least FIGS. 3 and 9, each of the clock signals GCLK1-1, GCLK2-1, GCLK1-2 and GCLK2-2 has a same frequency and a same duty cycle. Further in the implementations described herein, in the first set of clock signals, GCLK2-1 is phase-shifted 180 degrees from GCLK1-1. Likewise, in the second set of clock signals, GCLK2-2 is phase-shifted 180 degrees from GCLK1-2. Also in the implementations described herein, adjacent rows (or sequential rows) of a pixel row group can be clocked by different signals of a clock set group, which can prevent crosstalk between adjacent pixel rows and, as a result, also prevent undesired image artifacts. For instance, in this example implementation, a first pixel row and a second pixel row are included in a same display portion (pixel row group), and the first pixel row (e.g., a row driver for the first pixel row) can be clocked by the GCLK2-1 clock signal (e.g., while the GCLK1-1 clock signal is used for performing a shift register operation in the gate driver circuit), the row driver for the second pixel row can be clocked by the GCLK1-1 clock signal (e.g., the other signal of the first clock signal set). Such an approach is illustrated, at least, by FIG. 2, and the timing diagrams of FIGS. 3 and 9. In other implementations, other clocking approaches can be used.

In some implementations, other clock signal relationships (and sets of clock signals) can be used. For instance, different duty cycles, frequencies and/or phase relationships can be implemented. In some implementations, as noted above, additional sets of clock cycles can be used to drive additional respective groups of pixel row drivers (and corresponding pixel rows).

FIG. 1 is a block diagram illustrating a display apparatus 100 in which the approaches described herein can implemented. As shown in FIG. 1, the display apparatus 100 includes a display panel active area 110, a first gate driver circuit 120, a second gate driver circuit 130, and a display controller 140 (e.g., a display driver integrated circuit). The display controller 140 can be configured to provide gate start pulse (GSP) and gate clock (GCLK) signals 150 to the gate driver circuits 120 and 130 for driving pixel row drivers included in the gate driver circuits 120 and 130 to address (e.g., individually and sequentially) pixel rows of the display panel active area 110. In some implementations, the gate drivers 120 and 130 can be integrated in the display panel active area 110.

In some implementations, the display panel active area 110 can include a plurality of display pixels (e.g., organic light-emitting-diode (OLED) pixels) that are arranged in an active matrix (AM) of pixel rows and pixel columns, which can be referred to as an AMOLED display. In other implementations, other display panels (e.g., active-matrix display panels) can be used. As shown in FIG. 1, the display panel active area 110 can include a first display area portion 112 and a second display area portion 114. In this example, the first display area portion 112 can include a first group of pixel rows (and corresponding pixel row drivers), while the display 114 can include a second group of pixel rows (and corresponding pixel row drivers). As shown in FIG. 1, the display panel active area 110 can include additional display area portions.

However, for purposes of illustration, the display panel active area 110 will be described as having just two display area portions, the first display area portion 112 and the second display area portion 114. In this example, the first display area portion 112 and the second display area portion 114 can, together, include all pixel rows of the display panel active area 110, without any common rows. As discussed further below, the first display area portion 112 and the second display area portion 114 can be non-overlapping, or can be overlapping.

If the first display area portion 112 and the second display area portion 114 are non-overlapping, the pixel rows of each display area portion are included in respective contiguous blocks of pixel rows (without intervening pixel rows of the other display area portion). For instance, in the display apparatus 100, the pixel rows of the first display area portion 112 can be included in an upper (top) portion of the display panel active area 110, while the pixel rows of the second display area portion 114 are included in a lower (bottom) portion of the display panel active area 110, such as in the arrangement shown in FIG. 1.

If the first display area portion 112 and the second display area portion 114 are overlapping, each display area portion can have pixel rows that are interleaved with rows of the other display area portion. As an example of overlapping display area portions, a tenth pixel row, a twelfth pixel row, and a fourteenth pixel row from a top of the display panel active area 110 can be included (for clock signal delivery) in the first display area portion 112, while an eleventh pixel row, a thirteenth pixel row, and a fifteenth pixel row from the top of the display panel active area 110 can be included (for clock signal delivery) in the second display area portion 114. That is the tenth to fifteenth pixel rows of the display panel active area 110, in this example, can define an overlapping region between the first display area portion 112 and the second display area portion 114, where rows from one display area region are interleaved (alternate) with rows of the other display region.

In some implementations, the gate driver circuits 120 and 130 can each include a plurality of pixel row drivers, which can be implemented using clocked transmission gates. The plurality of pixel row drivers of the gate driver circuit 120 and the pixel row drivers of the gate driver circuit 130 can being configured as respective shift registers that sequentially and individually addresses the plurality of pixel rows of the display panel active area 110 (e.g., the display area). In some implementations, such as the example shown in FIG. 1 (as well as the implementations, shown in FIGS. 7 and 8), the pixel rows of the display panel active area 110 can be driven from both ends (e.g., from the left by the gate driver 120 and from the right by the gate driver 130).

As shown in FIG. 1, the display controller 140 includes a column driver 142 and a timing-control block 144. In this example, the column driver 142 can provide pixel data for the display panel active area 110. That is, when each pixel row of the display panel active area 110 is addressed by the gate driver 120 and/the gate driver 130, corresponding data provided on the column drivers can be clocked into respective pixels of the addressed pixel row. For an active-matrix display, that clocked in pixel data will then be actively maintained until the next time that pixel row is addressed (i.e., for a next image frame at a refresh rate of the display apparatus 100), and new pixel data is clocked into the pixel row.

The display apparatuses disclosed herein (e.g., as shown in FIGS. 1, 2 and 4-8), can be described as including a plurality of clock signal circuits for providing clock signals to gate driver circuits to address pixel rows. The specific elements included in such a clock circuit will depend on the particular embodiment, and can include elements that are distributed over various other functional entities (block, components, etc.) of a display device.

For instance, in the display apparatus 100, a clock circuit can include elements of the timing-control block 144, and a signal distribution network (clock distribution circuit, clock distribution tree, etc.) for distribution of the GSP and GCLK signals 150. Further, in the implementations described herein, such clock distribution circuits can be impedance matched with one another, so as to provide consistent clock signal timing to each of the pixel row drivers of the display apparatus 100 (e.g., to prevent image artifacts and reduce power consumption) by alternately and/or individually driving (providing) the clock signal sets (while idling other clock signal sets), such as using the approaches described herein. Further, as shown below with respect to FIGS. 2 and 3, the GSP signal can be a signal that is used to seed shift registers of the gate driver circuits 120 and 130 (e.g., to begin a scan cycle, a new frame, etc.) through the pixel rows of the display panel active area 110.

Figure 2:
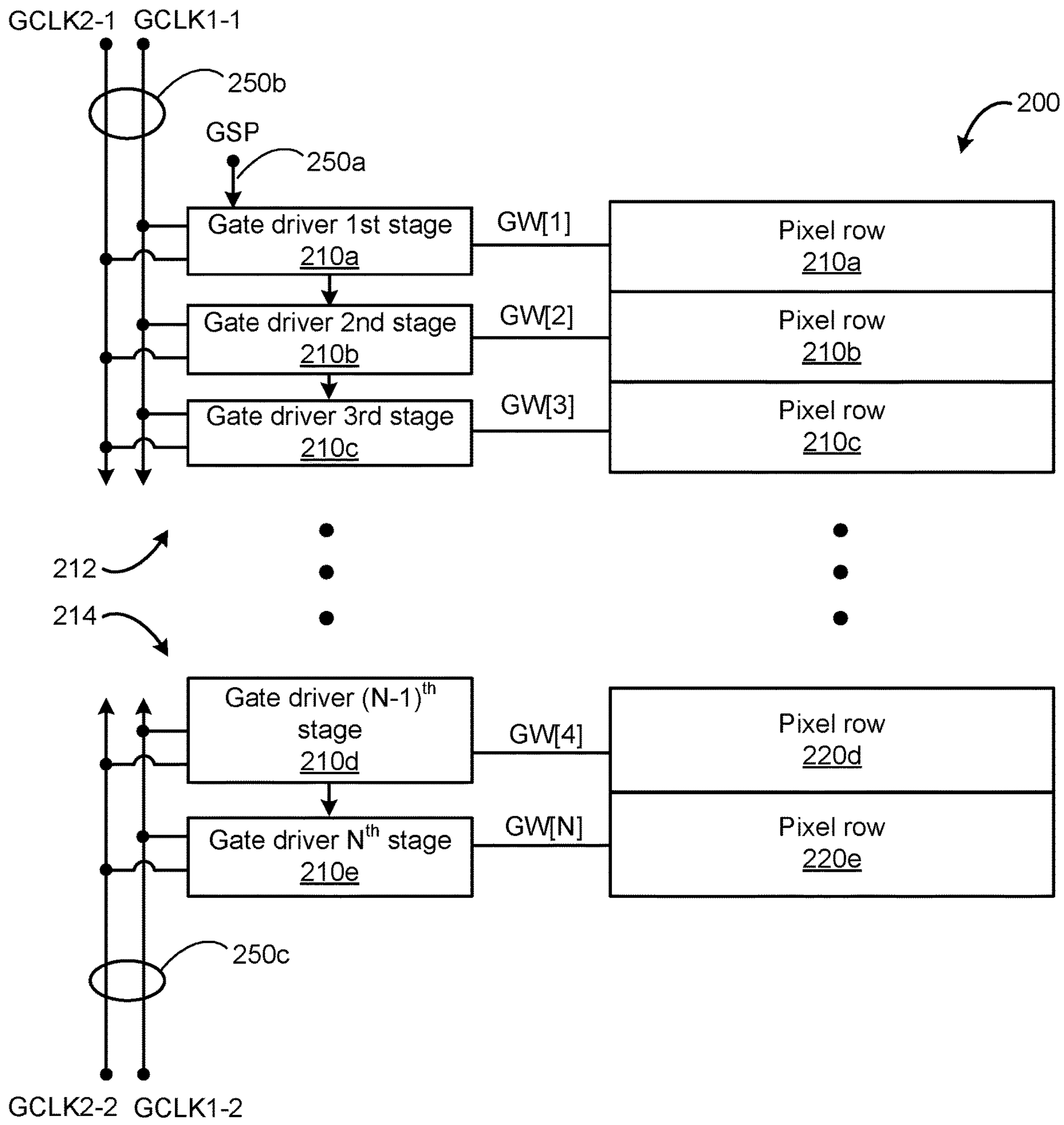
FIG. 2 is a block diagram illustrating a gate driver circuit (e.g., implemented as a shift register) and associated pixel rows that can be implemented in a display apparatus, such as the display apparatus of FIG. 1.

FIG. 2 is a block diagram illustrating elements of a gate driver circuit (e.g., implemented as a shift register) and associated pixel rows that can be implemented in a display apparatus 200, such as in an implementation of the display apparatus 100 of FIG. 1. As a display panel included in an active matrix display can include thousands of pixel row drivers and corresponding pixel rows, for purposes of clarity and illustration, only a portion of a plurality of gate driver stages (pixel row drivers, shift register stages, etc.) of a gate driver circuit and corresponding pixel rows of the display apparatus 200 are shown in FIG. 2. Also for purposes of brevity and clarity, other elements of the display 200 are not shown in FIG. 2, such as a display panel, a display controller (and associated column driver and timing control). In some implementations, the display apparatus 200 can operate in accordance with the timing diagram shown in FIG. 3, which is discussed below.

As shown in FIG. 2, the display apparatus 200 includes a first display area portion 212 and a second display area portion 214. FIG. 2 also illustrates a first gate driver stage 210*a*, a second gate driver stage 210*b* and a third gate driver stage 210*c* of the first display area portion 212. The gate driver stages 210*a*-210*c*, respectively drive (clock, etc.) a pixel row 220*a*, a pixel row 220*b* and a pixel row 220*c* of the first display area portion 212. In the display apparatus 200, an $(N-1)^{th}$ gate driver stage 210*d* and an $N^{th}$ gate driver stage 210*e* the second display area portion 214 are shown. As illustrated in FIG. 2, the $(N-1)^{th}$ gate driver stage 210*d* and the $N^{th}$ gate driver stage 210*e* (of an N row display panel) respectively drive (clock, etc.) a pixel row 220*d* and a pixel row 220*e*. As indicated in FIG. 2, the display device 200 can include additional pixel row drivers and corresponding pixel rows which can be included in one, or both of the first display area portion 212 and the second display area portion 214.

As shown in FIG. 2, a GSP signal (e.g., start pulse) can be applied to a terminal 250*a* of the first gate driver stage 210*a*, which can seed the shift register of the corresponding gate driver circuit. The GSP signal, as the gate driver stages are clocked, can be shifted, via Carry signals, from gate driver stage to gate driver stage. As shown in FIG. 2, the gate driver stages 210*a* through 210*e* can provide, respectively, gate write signals GW(1), GW(2), GW(3) GW(N−1) and GW(N) to drive (clock, etc.) to their corresponding pixel rows, as described above. For instance, the GW(1) signal can be provided in response to the GSP signal being clocked (shifted) into the first gate driver stage 210*a*, while the GW(2) through GW(N) signals can be provided when the Carry signal is clocked (shifted) into their respective gate driver stage.

As also shown in FIG. 2, a clock distribution circuit 250*b* can be configured to provide the first set of clock signals (GCLK1-1 and GCLK2-1, as previously discussed with respect to FIG. 1) to the first display area portion 212, while a clock distribution circuit 250*c* can be configured to provide the second set of clock signals (GCLK1-2 and GCLK2-2, as previously discussed with respect to FIG. 1) to the second display area portion 214. Signal distribution networks (clock signal trees) included, respectively, in the clock distribution circuit 250*b* and the clock distribution circuit 250*c* can be impedance matched with one another, such as using the approaches described herein. In this example, each of the clock distribution circuit 250*b* and the clock distribution circuit 250*c* can include two clock signal networks (clock distribution circuits, clock signal trees, etc.). In other words, each of the clock distribution circuit 250*b* and the 250*c* can have a respective clock distribution circuit for distributing each clock signal of the corresponding clock signal set, where the clock distribution circuits are impedance matched.

In this example (with two display area portions 212 and 214), the aggregate impedance (e.g., resistance and capacitance) of each of the signal distribution networks included in the clock distribution circuit 250*b* and the clock distribution circuit 250*c* can be approximately half the capacitance of signal distribution networks in conventional implementations using only a single set of clock signals and a single clock distribution circuit. In implementations where a greater number of clock signal sets and clock distribution circuits are implemented, further reductions in capacitive load for each clock distribution circuit can be realized.

By only operating one clock signal set (at full frequency) of multiple clock sets at a time, significant power savings can be achieved. However, increasing the number of clock signal sets used can also increase signal routing complexity, which can increase an overall area of an associated display panel. Tradeoffs between power savings and area impacts due to signal routing can be made based on the particular implementation.

In the example of FIGS. 1 and 2 (using two clock signal sets), as well as other example implementations described herein (e.g., as compared to implementations using a single clock signal set), a power savings of approximately 10% of overall display panel driving power can be realized for a 200 nit display at a 90 Hz refresh rate, where nit is a unit of brightness of 1 candela per square meter, a power savings of 10% of total power used to drive a display panel can be realized.

Figure 3:
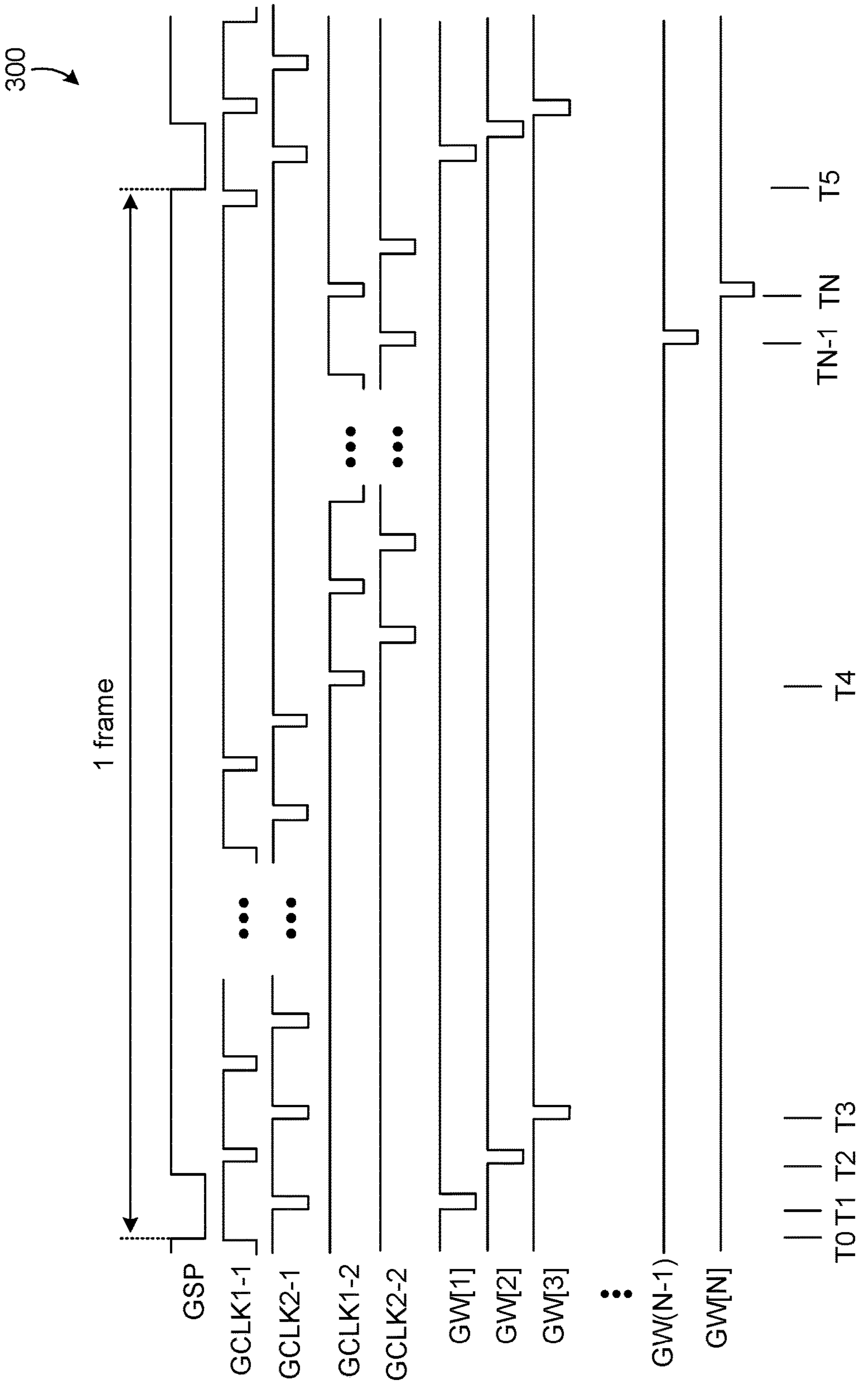
FIG. 3 is a timing diagram including signals that illustrate operation of the gate driver circuit and associated pixel rows of FIG. 2.

FIG. 3 is a timing diagram 300 including signals that illustrate operation of the gate driver circuit and associated pixel rows of FIG. 2. The timing diagram illustrates timing for a single frame (pixel row scan, etc.), indicated as 1 frame in FIG. 3. Signals for the elements of the display apparatus 200 are shown in FIG. 3. As with FIG. 2, because the display apparatus 200 can include a display panel having thousands (e.g., N in this example) of pixel rows, for purposes of brevity and clarity, only signals for the gate drivers and pixel rows shown in FIG. 2 are illustrated in in FIG. 3. Accordingly, timing signals associated with addressing a $4^{th}$ pixel row through an $(N-2)^{th}$ pixel row of the display apparatus 200 for the illustrated pixel row scan (one frame) are not shown in FIG. 3. Also for this discussion, FIG. 3 is described with further reference to FIG. 2.

Referring to FIG. 3, signal timing for the GSP signal, the first set of clock signals (GCLK1-1 and GCLK2-1), the second set of clock signals (GCLK1-2 and GCLK2-2), and the GW signals GW(1), GW(2), GW(3), GW(N−1) and GW(N) are shown. At time TO in FIG. 3, the GSP signal is provided to the gate driver stage 210*a* and, at time T1, is clocked in to the first gate driver stage 210*a* by the GCLK2-1 signal and the corresponding GW(1) signal is provided to the pixel row 220*a* to clock pixel data from a column driver into the pixel row 220*a*. At time T2, a carry signal from the first gate driver stage 210*a* can be clocked into the second gate driver stage 210*b* by the clock signal GCLK1-1 and the corresponding GW(2) signal can be provided to the pixel row 220*b*. Further, at time T2, the carry signal from the gate driver stage 210*b* can be clocked into the third gate driver stage 210*c* by the clock signal GCLK2-1 and the corresponding GW(3) signal can be provided to the pixel row 220*c*.

As shown in FIG. 3 during the time period from T0 to T5, the second set of clock signals (GCLK1-2 and GCLK2-2) is inactive (held idle at logic high), which saves power associated with clocking those signal for the second display area portion 214 when its rows are not being addressed. At time T4 in the timing diagram 300, the first set of clocks (GCLK1-1 and GCLK2-1) is idled (halted, held at logic 1, etc.) and the second set of clock signals is started, as shown in FIG. 3, to address pixel rows of the second display area portion 214.

As shown in FIG. 3, the one illustrated image frame cycle completes with final clocking cycles shown starting at time TN−1. First, at time TN−1, the carry signal from a previous gate driver stage is clocked into the $(N-1)^{th}$ gate driver stage 210*d* by the clock signal GCLK1-2 and the corresponding GW(N−1) signal is provided to the pixel row 220*d*. Second, at time TN, the carry signal from the gate driver stage 210*d* is clocked into the $N^{th}$ (e.g., last) gate driver stage 210*e* by the clock signal GCLK2-2 and the corresponding GW(N) signal can be provided to the pixel row 220*e*. Third, as shown in the timing diagram 300, at time T5, the second set of clocks can become idle again and the first set of clocks can become active again, after which the GSP signal is again applied to the first gate driver stage 210*a*, and a next frame (pixel row scan) begins.

Figure 4:
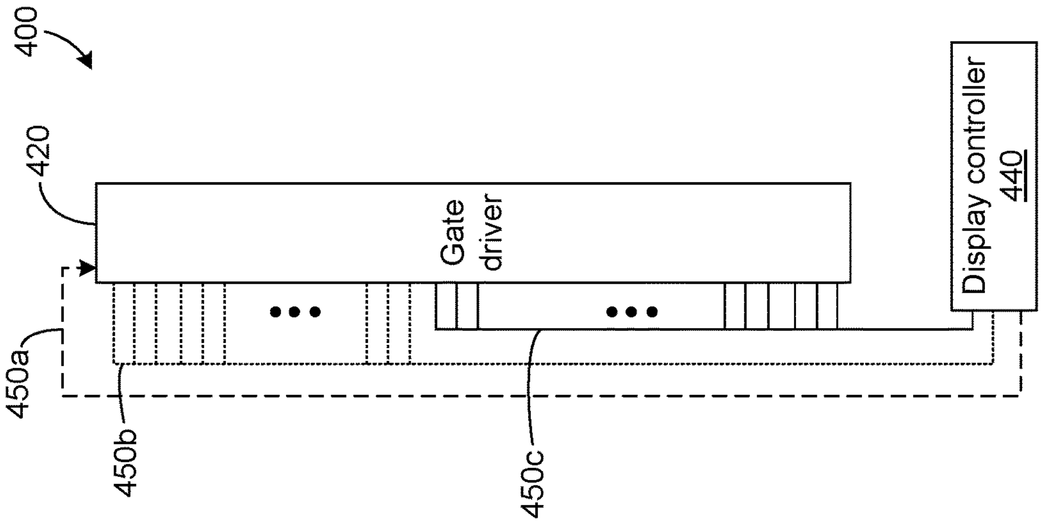
FIG. 4 is a diagram illustrating an approach for impedance matching of clock distribution circuits used in a display apparatus.

FIG. 4 is a diagram showing a display apparatus 400 illustrating an approach for impedance matching of clock distribution circuits included in a display apparatus. As shown in FIG. 4, the display apparatus 400 can include a gate driver circuit 420 (such as the gate driver circuits described above with respect to FIGS. 1 and 2), and a display controller 440. The apparatus 400 of FIG. 4 also includes a GSP signal line 450*a*, a first clock distribution circuit 450*b* and a second clock distribution circuit 450*c*. In some implementations, such as those described herein, a clock distribution circuit can include metal signal traces, input transistors or gates gate drivers, clock driver circuits, etc. As with the display apparatus 200 of FIG. 2, for purposes of brevity and clarity, other elements of the display 400 are not explicitly shown in FIG. 4, such as a display panel, a column driver, and a timing control block.

In the display apparatus 400, respective impedances (e.g., input impedances) of the clock distribution circuits 450*b* and 450*c* can be matched with each other by varying a number of pixel rows included in a first display portion (clocked by the clock distribution circuit 450*b*) as compared to a number of pixel rows included in a second display portion (clocked by the clock distribution circuit 450*c*). For instance, in this example, a larger number of pixel rows (and corresponding gate drivers) can be included in the second (bottom) display portion. For instance, as the second display portion, in this example, is closer to the display controller 440, and an associated timing control block, the impedance of clock distribution circuits (clock trees, clock signal networks, etc.) may be less than the impedance of clock distribution circuits of the first (upper) display potion, which is further from the display controller 440. By including more pixel rows in the second (bottom) display portion, impedance of associated clock distribution circuits can be matched with those of the first (upper) display portion, which can prevent image artifacts in associated display panel, such as those image artifacts described herein.

Figure 5:
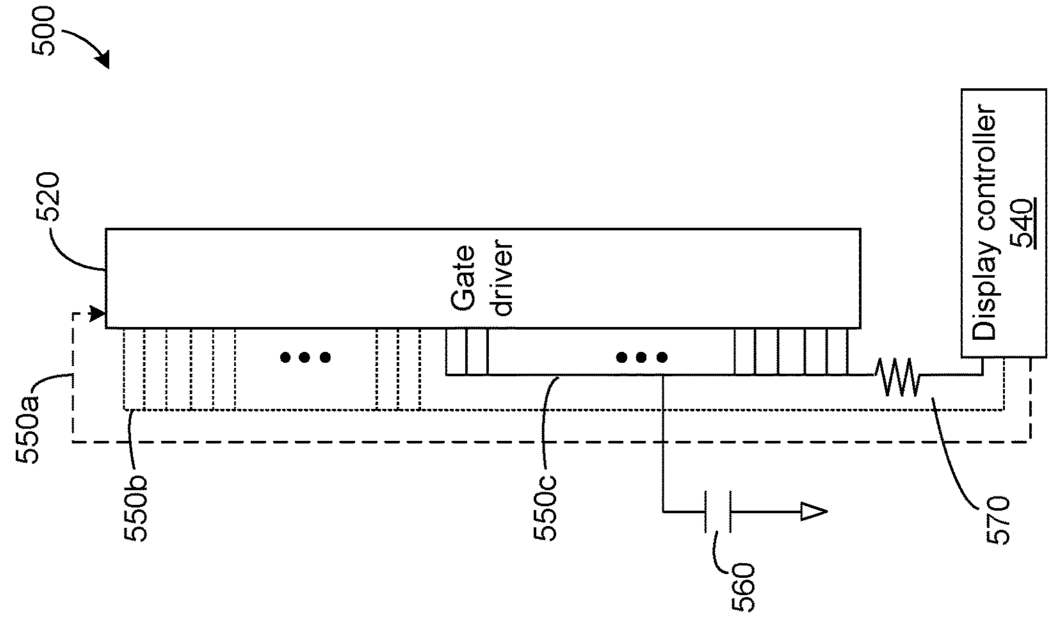
FIG. 5 is a diagram illustrating another approach for impedance matching of clock distribution circuits used in a display apparatus.

FIG. 5 is a diagram showing a display apparatus 500 illustrating another approach for impedance matching of clock distribution circuits included in a display apparatus. As shown in FIG. 5, the display apparatus 500 can include a gate driver circuit 520 (such as the gate driver circuits described above with respect to FIGS. 1 and 2), and a display controller 540. The apparatus 500 of FIG. 5 also includes a GSP signal line 550*a*, a first clock distribution circuit 550*b* and a second clock distribution circuit 550*c*. As with the display apparatus 200 of FIG. 2, for purposes of brevity and clarity, other elements of the display 500 are not explicitly shown in FIG. 5, such as a display panel, a column driver, and a timing control block.

In the display apparatus 500, respective impedances (e.g., input impedances) of the clock distribution circuits 550*b* and 550*c* can be matched with each other by adding a capacitance 560 and/or a resistance 570 to one of the clock distribution circuits (550*c* in this example) within an associated display panel (not shown). The approach of FIG. 5 can be used in implementations where a number of pixel rows and associated gate drivers include in a first (upper) display portion (clocked by the clock distribution circuit 450*b*) is equal to a number of pixel rows and associated gate drivers include in a lower (portion) display portion (clocked by the clock distribution circuit 450*c*). In some implementations, the approach of FIG. 5 can be used in combination with the approach of FIG. 4, where a number of pixel rows included in the first display portion is different than a number of pixel rows included in the second display portion. The approaches of FIG. 5, whether implemented alone or in combination with the approaches of FIG. 4, can also prevent image artifacts in an associated display panel, such as those image artifacts described herein.

Figure 6:
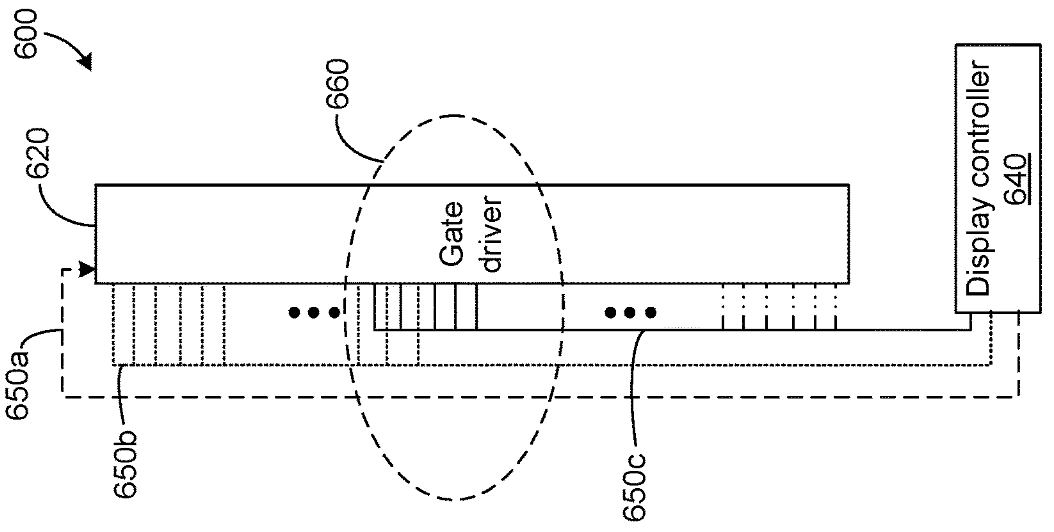
FIG. 6 is a diagram of a display apparatus illustrating an approach for vertical blending of pixel rows addressed by different clock signals (clock signal sets).

FIG. 6 is a diagram of a display apparatus 600 illustrating an approach for vertical blending of pixel rows addressed by different clock signals (clock signal sets), where the vertical blending can also be referred to as overlapping or partially overlapping display portions. As shown in FIG. 6, the display apparatus 600 can include a gate driver circuit 620 (such as the gate driver circuits described above with respect to FIGS. 1 and 2), and a display controller 640. The apparatus 600 of FIG. 6 also includes a GSP signal line 650*a*, a first clock distribution circuit 650*b* and a second clock distribution circuit 650*c*. As with the display apparatus 200 of FIG. 2, for purposes of brevity and clarity, other elements of the display 600 are not explicitly shown in FIG. 6, such as a display panel, a column driver, and a timing control block.

Figure 7:
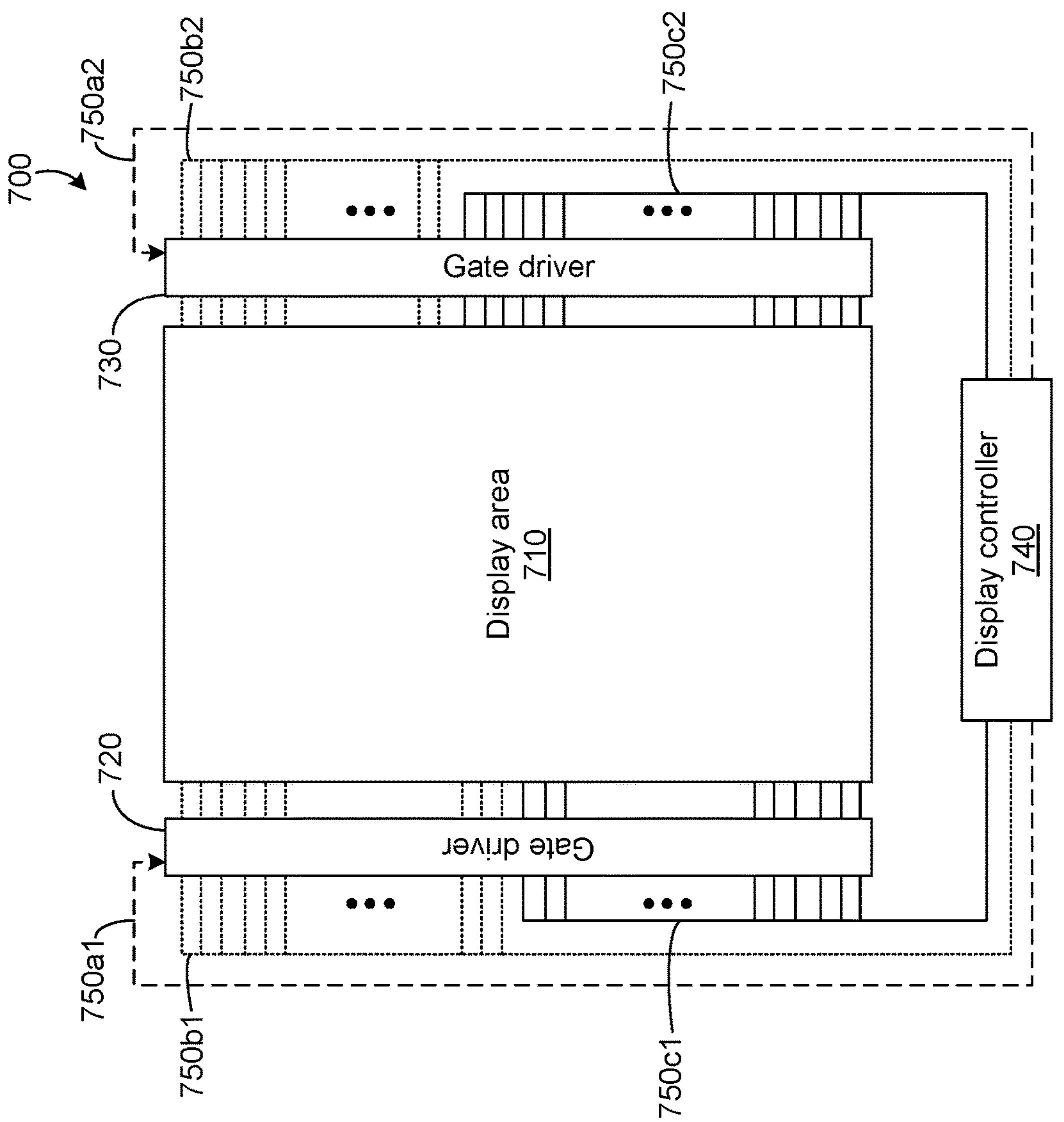
FIG. 7 is a diagram of a display apparatus illustrating an approach for horizontal blending of pixel rows.

The display apparatus 600, as shown in FIG. 6, includes a vertically blended region 660, where pixel rows of a first (upper) display portion are interleaved with pixel rows of a second (lower) display portion. For instance, as shown in FIG. 6, the blended region 660 includes pixel rows that are clocked, or have associated gate driver stages (pixel row drivers) that are clocked by the first clock signal set (using the first clock distribution circuit 650*b*). Those rows of the first display portion in the blended region 660 alternate with pixel rows that are clocked, or have associated gate driver stages (pixel row drivers) that are clocked by the second clock signal set (using the second clock distribution circuit 650*c*). The approach of FIG. 6 can prevent image artifacts, such as those described herein, by distributing such visual effects over the blended region 660. The approaches of FIG. 6 can, in some implementations, be used in combination with the respective approaches of FIG. 4 and/or FIG. 7 is a diagram of a display apparatus 700 illustrating an approach for horizontal blending of pixel rows, including addressing horizontally blended pixel rows using different clock signals (clock signal sets). The display apparatus 700 includes a display panel active area 710 (e.g., an active-matrix display array, a display pixel array, etc.), a first gate driver circuit 720, a second gate driver circuit 730, a display controller 740, a first GSP signal line 750*a*1, a first clock signal distribution circuit 750*b*1, a second clock distribution circuit 750*c*1, a second GSP signal line 750*a*2, a third clock signal distribution circuit 750*b*2, and a fourth clock distribution circuit 750*c*2.

Similar to the gate driver circuit 120 and gate driver circuit 130 of the display apparatus 100, the gate driver circuit 720 is a first gate driver circuit that includes gate driver stages (shift register stages) that are respectively coupled with first ends of the plurality of pixel rows of the display panel active area 710, and the gate driver circuit 730 is a second gate driver circuit that includes gate driver stages (shift register stages) that are respectively coupled with second ends of the plurality of pixel rows of the display panel active area 710. Both the gate driver circuit 720 and the second gate driver circuit 730 can be configured as respective shift registers that sequentially and individually addresses the plurality of pixel rows of the display area from their respective ends (sides of the display panel) using, in some implementations, two more sets of clock signals.

As can be seen in FIG. 7, some pixel rows of the display panel active area 710 are driven using the first set of clock signals from the first clock distribution circuit 750*b*1, e.g., from the left side of the display panel active area 710, and driven using the second set of clock signals from the clock distribution circuit 750*c*2, e.g., from the right side of the display panel active area 710, which creates a horizontally blended region with some pixel rows being driven from one end using one clock signal set, and driven from the other end using another clock signal set.

Figure 8:
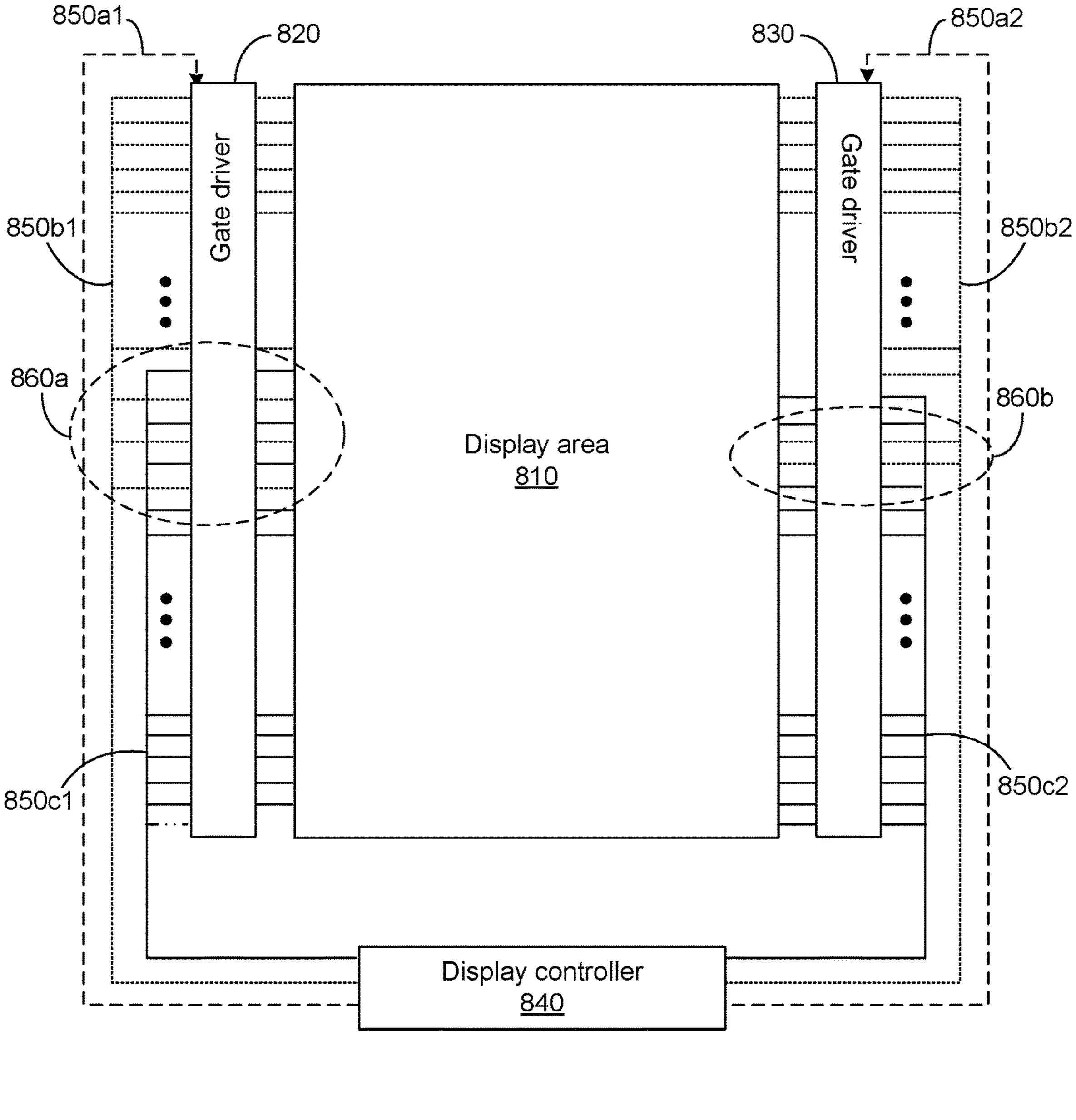
FIG. 8 is a diagram of a display apparatus that implements both vertical blending, as illustrated in FIG. 6, and horizontal blending, as illustrated in FIG. 7.

FIG. 8 is a diagram of a display apparatus 800 that implements both vertical blending, as illustrated in FIG. 6, and horizontal blending, as illustrated in FIG. 7. The display apparatus 800 includes a display panel active area 810 (e.g., an active-matrix array, a display pixel array, etc.), a first gate driver circuit 820, a second gate driver circuit 830, a display controller 840, a first GSP signal line 850*a*1, a first clock signal distribution circuit 850*b*1, a second clock distribution circuit 850*c*1, a second GSP signal line 850*a*2, a third clock signal distribution circuit 850*b*2, and a fourth clock distribution circuit 850*c*2.

As shown in the FIG. 8, the display apparatus 800 includes a first blended area 860*a* and a second blended area 860*b*, which can be implemented using the vertical blending approaches described above with respect to, at least, FIG. 6. Also, the display apparatus 800 implements horizontal blending, such as described with respect to the display device 700 of FIG. 7. The approaches of FIGS. 6, 7 and 8 can, in some implementations, be implemented in combination with other approaches described herein, such as those approaches described with respect to, at least, FIGS. 4 and 5.

Figure 9:
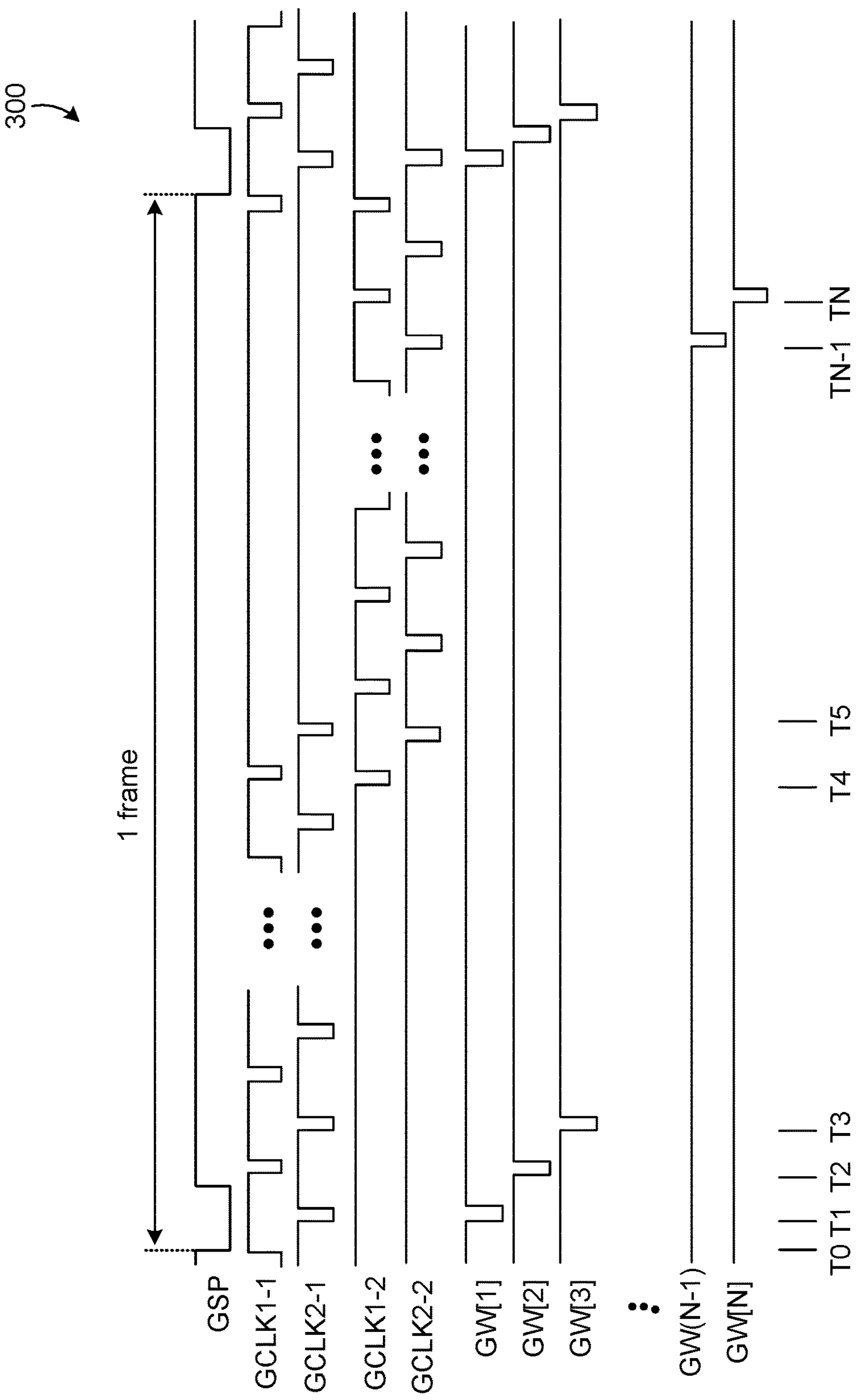
FIG. 9 is a timing diagram illustrating signals that can be implemented in the display apparatuses of FIGS. 6 to 8.

FIG. 9 is a timing diagram 900 illustrating signals that can be implemented in the display apparatuses of FIGS. 6 to 8. As with the timing diagram 300 of FIG. 3, the timing diagram 900 includes signal timing for the GSP signal, the first set of clock signals (GCLK1-1 and GCLK2-1), the second set of clock signals (GCLK1-2 and GCLK2-2), and the GW signals GW(1), GW(2), GW(3), GW(N−1) and GW(N) are shown. The timing of these signals, as shown in the timing diagram 900 at times T0, T1, T2, TN−1 and TN is similar to, or the same as shown in FIG. 3. Accordingly, that timing will not be discussed again with respect to FIG. 9. The timing of the timing diagram 900 differs from that of the timing diagram 300 in that at T4 to T5, the first set of clock signals (GCLK1-1 and GCLK2-1) overlaps with the second set of clock signals (GCLK1-2 and GCLK2-2). Such timing can be used to account for vertical and or horizontal blending, so the additional image artifacts are prevented as a result of the blending approaches shown in FIGS. 6-8. The number of overlapping clock periods will depend, for example, on the number of pixel rows that are vertically and/or horizontally blended.

Figure 10:
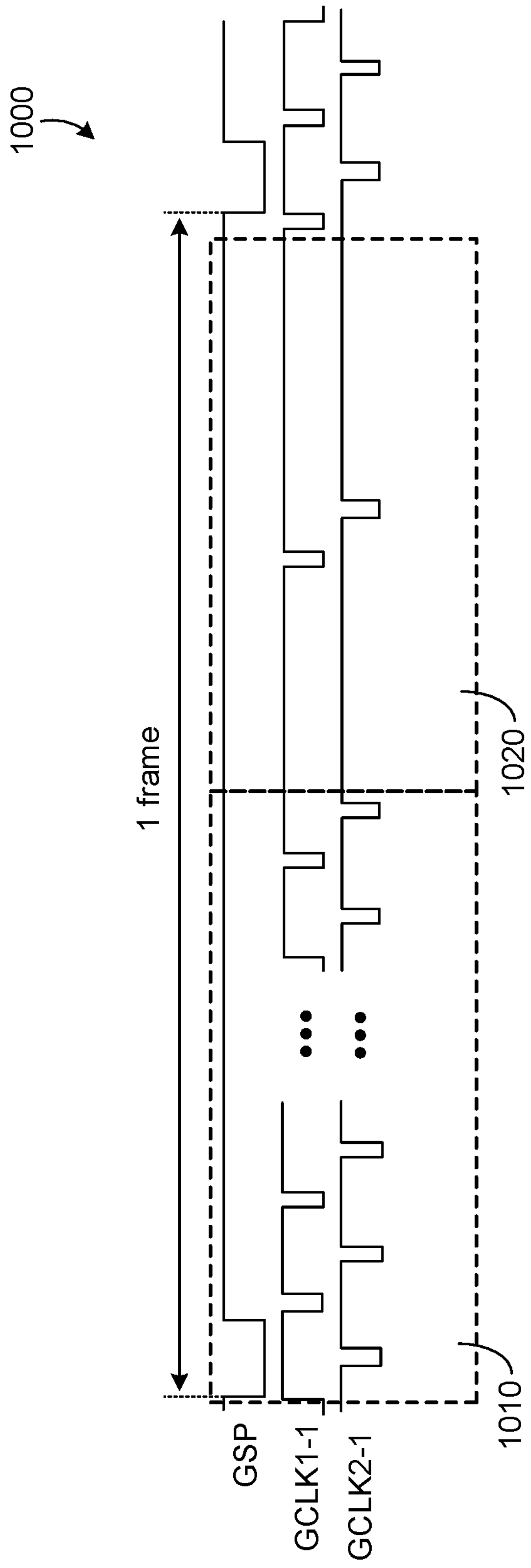
FIG. 10 is a timing diagram illustrating example clock signals that can be implemented in the display apparatuses described herein.

FIG. 10 is a timing diagram 1000 illustrating example clock signals that can be implemented in the display apparatuses described herein. In some implementations of gate driver circuits in display apparatuses, if the input clock signals stay idle for too long a period of time, the associated gate driver stages (pixel line drivers) may not maintain stable voltage levels on their outputs (e.g. the GW signals provided to associated pixel rows).

In such cases, clock signal sets, such as the clock signal set illustrated in the timing diagram 1000 can be used. In the timing diagram 1000, the set of clock signals (e.g., GCLK1-1 and GCLK2-1) has an active period 1010 (which is similar or the same to the active clock signal periods discussed with respect to FIG. 3). The timing diagram 1000 also includes a low-frequency period 1020, where the clock signals can continue to toggle, by a lower frequency than during the active period 1010. For instance the first set of clock signals GCLK1-1 and GCLK2-1 are illustrated during their active period 1010 and their low-frequency period 1020. In some implementations, a second set of clock signals including GCLK1-2 and GCLK2-2, as discussed above, (as well as other sets of clock signals) can operate similarly, with an active period 1010 and a low-frequency period 1020. Using such approaches, in some implementations, can allow for power savings and prevention of image artifacts, as well as maintaining stable voltages on associated gate driver stages. The timing of FIG. 10 can be implemented in the various example implementations described herein, such as with respect to FIGS. 1, 2, and 4-8, as well as other display device apparatuses.

Figure 11:
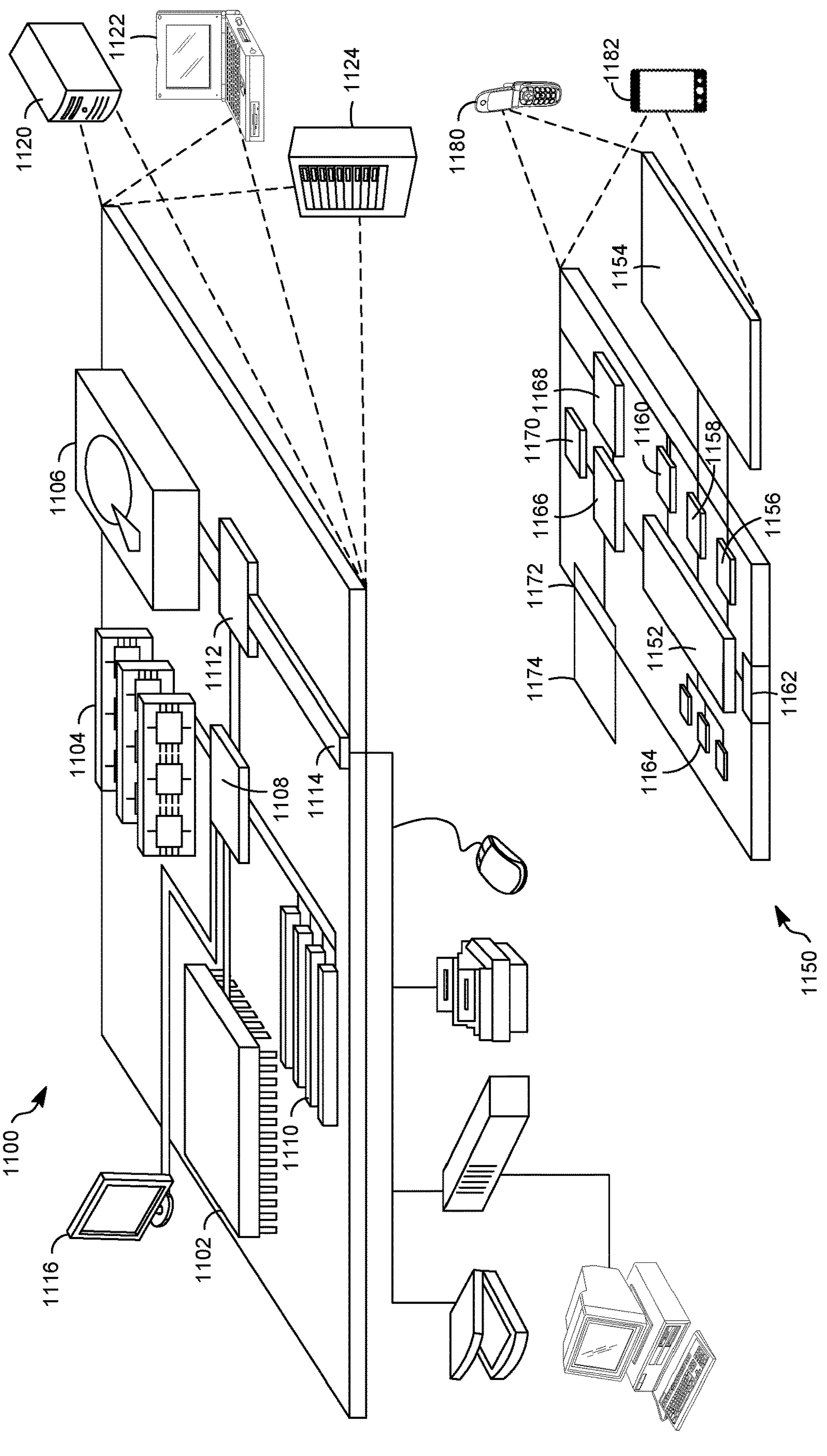
FIG. 11 is a diagram illustrating an example of a computer device and a mobile computer device that can be used to implement the techniques described here.

FIG. 11 shows an example of a generic computer device 1100 and a generic mobile computer device 1150, which may be used with the techniques described here. Computing device 1100 is intended to represent various forms of digital computers, such as laptops, desktops, tablets, workstations, personal digital assistants, televisions, servers, blade servers, mainframes, and other appropriate computing devices. Computing device 1150 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1100 includes a processor 1102, memory 1104, a storage device 1106, a high-speed interface 1108 connecting to memory 1104 and high-speed expansion ports 1110, and a low speed interface 1112 connecting to low speed bus 1114 and storage device 1106. The processor 1102 can be a semiconductor-based processor. The memory 1104 can be a semiconductor-based memory. Each of the components 1102, 1104, 1106, 1108, 1110, and 1112, are interconnected using various busses, and may be mounted on a common motherboard or in other manners as appropriate. The processor 1102 can process instructions for execution within the computing device 1100, including instructions stored in the memory 1104 or on the storage device 1106 to display graphical information for a GUI on an external input/output device, such as display 1116 coupled to high speed interface 1108. In other implementations, multiple processors and/or multiple buses may be used, as appropriate, along with multiple memories and types of memory. Also, multiple computing devices 1100 may be connected, with each device providing portions of the necessary operations (e.g., as a server bank, a group of blade servers, or a multi-processor system).

The memory 1104 stores information within the computing device 1100. In one implementation, the memory 1104 is a volatile memory unit or units. In another implementation, the memory 1104 is a non-volatile memory unit or units. The memory 1104 may also be another form of computer-readable medium, such as a magnetic or optical disk.

The storage device 1106 is capable of providing mass storage for the computing device 1100. In one implementation, the storage device 1106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1104, the storage device 1106, or memory on processor 1102.

The high speed controller 1108 manages bandwidth-intensive operations for the computing device 1100, while the low speed controller 1112 manages lower bandwidth-intensive operations. Such allocation of functions is exemplary only. In one implementation, the high-speed controller 1108 is coupled to memory 1104, display 1116 (e.g., through a graphics processor or accelerator), and to high-speed expansion ports 1110, which may accept various expansion cards (not shown). In the implementation, low-speed controller 1112 is coupled to storage device 1106 and low-speed expansion port 1114. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1100 may be implemented in a number of different forms, as shown in the figure. For example, it may be implemented as a standard server 1120, or multiple times in a group of such servers. It may also be implemented as part of a rack server system 1124. In addition, it may be implemented in a personal computer such as a laptop computer 1122. Alternatively, components from computing device 1100 may be combined with other components in a mobile device (not shown), such as device 1150. Each of such devices may contain one or more of computing device 1100, 1150, and an entire system may be made up of multiple computing devices 1100, 1150 communicating with each other.

Computing device 1150 includes a processor 1152, memory 1164, an input/output device such as a display 1154, a communication interface 1166, and a transceiver 1168, among other components. The device 1150 may also be provided with a storage device, such as a microdrive or other device, to provide additional storage. Each of the components 1150, 1152, 1164, 1154, 1166, and 1168, are interconnected using various buses, and several of the components may be mounted on a common motherboard or in other manners as appropriate.

The processor 1152 can execute instructions within the computing device 1150, including instructions stored in the memory 1164. The processor may be implemented as a chipset of chips that include separate and multiple analog and digital processors. The processor may provide, for example, for coordination of the other components of the device 1150, such as control of user interfaces, applications run by device 1150, and wireless communication by device 1150.

Processor 1152 may communicate with a user through control interface 1158 and display interface 1156 coupled to a display 1154. The display 1154 may be, for example, a TFT LCD (Thin-Film-Transistor Liquid Crystal Display) or an OLED (Organic Light Emitting Diode) display, or other appropriate display technology. The display interface 1156 may comprise appropriate circuitry for driving the display 1154 to present graphical and other information to a user. The control interface 1158 may receive commands from a user and convert them for submission to the processor 1152. In addition, an external interface 1162 may be provided in communication with processor 1152, so as to enable near area communication of device 1150 with other devices. External interface 1162 may provide, for example, for wired communication in some implementations, or for wireless communication in other implementations, and multiple interfaces may also be used.

The memory 1164 stores information within the computing device 1150. The memory 1164 can be implemented as one or more of a computer-readable medium or media, a volatile memory unit or units, or a non-volatile memory unit or units. Expansion memory 1174 may also be provided and connected to device 1150 through expansion interface 1172, which may include, for example, a SIMM (Single In Line Memory Module) card interface. Such expansion memory 1174 may provide extra storage space for device 1150, or may also store applications or other information for device 1150. Specifically, expansion memory 1174 may include instructions to carry out or supplement the processes described above, and may include secure information also. Thus, for example, expansion memory 1174 may be provided as a security module for device 1150, and may be programmed with instructions that permit secure use of device 1150. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1164, expansion memory 1174, or memory on processor 1152, that may be received, for example, over transceiver 1168 or external interface 1162.

Device 1150 may communicate wirelessly through communication interface 1166, which may include digital signal processing circuitry where necessary. Communication interface 1166 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1168. In addition, short-range communication may occur, such as using a Bluetooth, WiFi, or other such transceiver (not shown). In addition, GPS (Global Positioning System) receiver module 1170 may provide additional navigation- and location-related wireless data to device 1150, which may be used as appropriate by applications running on device 1150.

Device 1150 may also communicate audibly using audio codec 1160, which may receive spoken information from a user and convert it to usable digital information. Audio codec 1160 may likewise generate audible sound for a user, such as through a speaker, e.g., in a handset of device 1150. Such sound may include sound from voice telephone calls, may include recorded sound (e.g., voice messages, music files, etc.) and may also include sound generated by applications operating on device 1150.

The computing device 1150 may be implemented in a number of different forms, as shown in the figure. For example, it may be implemented as a cellular telephone 1180. It may also be implemented as part of a smart phone 1182, personal digital assistant, or other similar mobile device.

In a first example, an active-matrix display can include a display area including a plurality of display pixels arranged in a matrix of a plurality of pixel rows and a plurality of pixel columns, and a gate driver circuit including a plurality of pixel row drivers. The plurality of pixel row drivers can be configured as a shift register that sequentially and individually addresses the plurality of pixel rows of the display area. The display can also include a first clock circuit configured to provide a first set of clock signals to a first portion of the plurality of pixel row drivers to address a respective first portion of the plurality of pixel rows. The first clock circuit can include at least one clock signal distribution circuit having a first input impedance. The display can further include a second clock circuit configured to provide a second set of clock signals to a second portion of the plurality of pixel row drivers to address a respective second portion of the plurality of pixel rows. The second clock circuit can include at least one clock signal distribution circuit having a second input impedance that is matched with the first input impedance.

In a second example based the first example, the first set of clock signals can include a first clock signal and a second clock signal. The first clock signal and the second clock signal can have a same frequency and a same duty cycle. The second clock signal can be phase shifted one-hundred-eighty degrees from the first clock signal. The second set of clock signals can include a third clock signal and a fourth clock signal. The third clock signal and the fourth clock signal can have the same frequency and the same duty cycle as the first clock signal and the second clock signal. The fourth clock signal can be phase shifted one-hundred-eighty degrees from the third clock signal.

In a third example based any of the previous examples, the at least one clock signal distribution circuit of the first clock circuit can include a first clock distribution circuit configured to distribute the first clock signal. The first clock distribution circuit can have the first input impedance. The at least one clock signal distribution circuit of the first clock circuit can further include a second clock distribution circuit configured to distribute the second clock signal. The second clock distribution circuit having a third input impedance that is matched with the first input impedance. The at least one clock signal distribution circuit of the second clock circuit can include a third clock distribution circuit configured to distribute the third clock signal. The third clock distribution circuit can have a second input impedance. The at least one clock signal distribution circuit of the second clock circuit can further include a fourth clock distribution circuit configured to distribute the fourth clock signal. The fourth clock distribution circuit can have a fourth input impedance that is matched with the first input impedance.

In a fourth example based on any of the previous examples, the first clock circuit can be configured to provide the first set of clock signals when pixel rows of the first portion of pixel rows are being addressed by the gate driver circuit, and inactivate the first set of clock signals when pixel rows of the second portion of the pixel rows are being addressed by the gate driver circuit. The second clock circuit can be configured to provide the second set of clock signals when pixel rows of the second portion of pixel rows are being addressed by the gate driver circuit, and inactivate the second set of clock signals when pixel rows of the first portion of the pixel rows are being addressed by the gate driver circuit.

In a fifth example based on any of the previous examples, the first clock circuit can be configured to provide the first set of clock signals at a refresh rate frequency when pixel rows of the first portion of pixel rows are being addressed by the gate driver circuit, and provide the first set of clock signals at a frequency less than the refresh rate frequency when pixel rows of the second portion of the pixel rows are being addressed by the gate driver circuit. The second clock circuit can be configured to provide the second set of clock signals at the refresh rate frequency when pixel rows of the second portion of pixel rows are being addressed by the gate driver circuit, and provide the second set of clock signals at the frequency less than the refresh rate frequency when pixel rows of the first portion of the pixel rows are being addressed by the gate driver circuit.

In a sixth example based on any of the previous examples, the second input impedance can be matched with the first input impedance, at least in part, based on a number of pixel row drivers included in the first portion of the plurality of pixel row drivers and a number of pixel row drivers included in the second portion of the plurality of pixel row drivers.

In a seventh example based on any of the previous examples, the second input impedance can be matched with the first input impedance, at least in part, by coupling at least one of a capacitor or a resistor to the second clock distribution circuit.

In an eighth example based on any of the previous examples, pixel rows of the respective first portion of the plurality of pixel rows can be included in a first portion of the display area, and pixel rows of the respective second portion of the plurality of pixel rows are included in a second portion of the display area. The first portion of the display area and the second portion of the display area can be non-overlapping.

In a ninth example based on any of the first to seventh examples, pixel rows of the respective first portion of the plurality of pixel rows can be included in a first portion of the display area, and pixel rows of the respective second portion of the plurality of pixel rows can be included in a second portion of the display area. The first portion of the display area and the second portion of the display area can be at least partially overlapping.

In a tenth example based on any of the previous examples, the gate driver circuit can be a first gate driver circuit, the plurality of pixel row drivers can be a first plurality of pixel row drivers that are coupled, respectively, with first ends of the plurality of pixel rows, and the shift register can be a first shift register. The display can further include a second gate driver circuit including a second plurality of pixel row drivers. The second plurality of pixel row drivers can be configured as a second shift register that sequentially and individually addresses the plurality of pixel rows of the display area. The second plurality of pixel row drivers can be coupled, respectively, with second ends of the plurality of pixel rows. The first clock circuit can be further configured to provide the first set of clock signals to a third portion of the plurality of pixel row drivers to address a respective third portion of the plurality of pixel rows. The second clock circuit can be configured to provide the second set of clock signals to a fourth portion of the plurality of pixel row drivers to address a respective fourth portion of the plurality of pixel rows.

In an eleventh example based on the tenth example, the respective third portion of the plurality of pixel rows can be a different set of pixel rows than the respective first portion of the plurality of pixel rows, and the respective fourth portion of the plurality of pixel rows can be a different set of pixel rows than the respective second portion of the plurality of pixel rows.

In a twelfth example based on the eleventh example, pixel rows of the respective third portion of the plurality of pixel rows are included in a first portion of the display area, pixel rows of the respective fourth portion of the plurality of pixel rows are included in a second portion of the display area, the first portion of the display area and the second portion of the display area can be non-overlapping.

In a thirteenth example based on the eleventh example, pixel rows of the respective third portion of the plurality of pixel rows can be included in a first portion of the display area, pixel rows of the respective fourth portion of the plurality of pixel rows are included in a second portion of the display area, and the first portion of the display area and the second portion of the display area can be at least partially overlapping.

In a fourteenth example, an electronic device can include the display of any of the preceding examples.

In a fifteenth example, a method for operating an active-matrix display can include providing, via at least a first clock distribution circuit having a first input impedance, a first set of clock signals to a first portion of a plurality of pixel row drivers included in a gate driver circuit. The plurality of pixel row drivers can be configured as a shift register that sequentially and individually addresses a plurality of pixel rows of a display area of the active-matrix display. The first portion of the plurality of pixel row drivers can be coupled, respectively, with pixel rows of a first portion of the plurality of pixel rows. The method can also include providing, via at least a second clock distribution circuit having a second input impedance, a second set of clock signals to a second portion of the plurality of pixel row drivers included in the gate driver circuit. The second portion of the plurality of pixel row drivers can be coupled, respectively, with pixel rows of a second portion of the plurality of pixel rows. The second input impedance can be matched with the first input impedance.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. An active-matrix display comprising:

a display area including a plurality of display pixels arranged in a matrix of a plurality of pixel rows and a plurality of pixel columns;

a gate driver circuit including a plurality of pixel row drivers, the plurality of pixel row drivers being configured as a shift register that sequentially and individually addresses the plurality of pixel rows of the display area, the plurality of pixel row drivers including:

a first set of multiple pixel row drivers configured to address a first set of multiple pixel rows of the plurality of pixel rows; and a second set of multiple pixel row drivers configured to address a second set of multiple pixel rows of the plurality of pixel rows, wherein the second set of multiple pixels rows follows the first set of multiple pixel rows;

a first clock circuit configured to:

provide a first clock signal and a second clock signal to each pixel row driver in the first set of multiple pixel row drivers, when the gate driver circuit is addressing the first set of multiple pixel row drivers that are configured to address the first set of multiple pixel rows; and inactivate the first clock signal and the second clock signal, when the gate driver circuit is addressing the second set of multiple pixel row drivers that are configured to address the second set of multiple pixel rows, the first clock circuit including at least one clock signal distribution circuit having a first input impedance; and a second clock circuit configured to:

provide a third clock signal and a fourth clock signal to each pixel row driver in the second set of multiple pixel row drivers, when the gate driver circuit is addressing the second set of multiple pixel row drivers that are configured to address the second set of multiple pixel rows; and inactivate the third clock signal and the fourth clock signal, when the gate driver circuit is addressing the first set of multiple pixel row drivers that are configured to address the first set of multiple pixel rows, the second clock circuit including at least one clock signal distribution circuit having a second input impedance that is matched with the first input impedance.

2. The active-matrix display of claim 1, wherein:

the first clock circuit is configured to inactivate the first clock signal and the second clock signal, when the gate driver circuit is addressing the second set of multiple pixel row drivers, for a duration of multiple clock cycle time periods of the third clock signal and the fourth clock signal; and the second clock circuit is configured to inactivate the third clock signal and the fourth clock signal, when the gate driver circuit is addressing the first set of multiple pixel row drivers, for a duration of multiple clock cycle time periods of the first clock signal and the second clock signal.

3. The active-matrix display of claim 1, wherein:

the first clock circuit is configured to inactivate the first clock signal and the second clock signal, when the gate driver circuit is addressing the second set of multiple pixel row drivers, for a duration over which a plurality of pixel row drivers in the second set of multiple pixel row drivers scan their respective rows; and the second clock circuit is configured to inactivate the third clock signal and the fourth clock signal, when the gate driver circuit is addressing the first set of multiple pixel row drivers, for a duration over which a plurality of pixel row drivers in the first set of multiple pixel row drivers scan their respective rows.

4. An electronic device comprising an active-matrix display, the active-matrix display including:

a display area including a plurality of display pixels arranged in a matrix of a plurality of pixel rows and a plurality of pixel columns;

a gate driver circuit including a plurality of pixel row drivers, the plurality of pixel row drivers being configured as a shift register that sequentially and individually addresses the plurality of pixel rows of the display area, the plurality of pixel row drivers including:

a first set of multiple pixel row drivers configured to address a first set of multiple pixel rows of the plurality of pixel rows; and a second set of multiple pixel row drivers configured to address a second set of multiple pixel rows of the plurality of pixel rows, wherein the second set of multiple pixels rows follows the first set of multiple pixel rows;

a first clock circuit configured to:

provide a first clock signal and a second clock signal to each pixel row driver in the first set of multiple pixel row drivers, when the gate driver circuit is addressing the first set of multiple pixel row drivers that are configured to address the first set of multiple pixel rows; and inactivate the first clock signal and the second clock signal, when the gate driver circuit is addressing the second set of multiple pixel row drivers that are configured to address the second set of multiple pixel rows, the first clock circuit including at least one clock signal distribution circuit having a first input impedance; and a second clock circuit configured to:

provide a third clock signal and a fourth clock signal to each pixel row driver in the second set of multiple pixel row drivers, when the gate driver circuit is addressing the second set of multiple pixel row drivers that are configured to address the second set of multiple pixel rows; and inactivate the third clock signal and the fourth clock signal, when the gate driver circuit is addressing the first set of multiple pixel row drivers that are configured to address the first set of multiple pixel rows, the second clock circuit including at least one clock signal distribution circuit having a second input impedance that is matched with the first input impedance.

5. A method of operating a display device with (i) a display area including a plurality of display pixels arranged in a matrix of a plurality of pixel rows and a plurality of pixel columns, (ii) a gate driver circuit including a plurality of pixel row drivers configured as a shift register that sequentially and individually addresses the plurality of pixel rows of the display area, the plurality of pixel row drivers including a first set of multiple pixel row drivers configured to address a first set of multiple pixel rows of the plurality of pixel rows, and a second set of multiple pixel row drivers configured to address a second set of multiple pixel rows of the plurality of pixel rows, with the second set of multiple pixels rows following the first set of multiple pixel rows, (iii) a first clock circuit including at least one clock signal distribution circuit having a first input impedance, and (iv) a second clock circuit including at least one clock signal distribution circuit having a second input impedance that is matched with the first input impedance, the method comprising:

providing, by the first clock circuit, a first clock signal and a second clock signal to each pixel row driver in the first set of multiple pixel row drivers, when the gate driver circuit is addressing the first set of multiple pixel row drivers that are configured to address the first set of multiple pixel rows;

inactivating the first clock signal and the second clock signal, when the gate driver circuit is addressing the second set of multiple pixel row drivers that are configured to address the second set of multiple pixel rows;

providing, by the second clock circuit, a third clock signal and a fourth clock signal to each pixel row driver in the second set of multiple pixel row drivers, when the gate driver circuit is addressing the second set of multiple pixel row drivers that are configured to address the second set of multiple pixel rows; and inactivating the third clock signal and the fourth clock signal, when the gate driver circuit is addressing the first set of multiple pixel row drivers that are configured to address the first set of multiple pixel rows.

* * * * *